(12) United States Patent
Lavine

(10) Patent No.: US 9,703,842 B2
(45) Date of Patent: Jul. 11, 2017

(54) USER INTERFACE FOR SEARCH METHOD AND SYSTEM

(71) Applicant: Transparensee Systems, Inc., New York, NY (US)

(72) Inventor: Steven David Lavine, New York, NY (US)

(73) Assignee: Transparensee Systems, Inc., New York, NY (US)

( * ) Notice: Subject to any disclaimer, the term of this patent is extended or adjusted under 35 U.S.C. 154(b) by 373 days.

(21) Appl. No.: 14/461,764

(22) Filed: Aug. 18, 2014

(65) Prior Publication Data

US 2015/0074097 A1    Mar. 12, 2015

Related U.S. Application Data

(60) Provisional application No. 61/875,568, filed on Sep. 9, 2013.

(51) Int. Cl.
*G06F 17/00*     (2006.01)
*G06F 17/30*     (2006.01)
*G06F 3/0484*    (2013.01)
*G06F 3/0486*    (2013.01)

(52) U.S. Cl.
CPC ...... *G06F 17/30542* (2013.01); *G06F 3/0486* (2013.01); *G06F 3/04842* (2013.01); *G06F 17/3053* (2013.01); *G06F 17/30554* (2013.01)

(58) Field of Classification Search
CPC ......... G06F 17/30867; G06F 17/30864; G06F 17/30554; G06F 17/30241; G06F 17/3053
See application file for complete search history.

(56) References Cited

U.S. PATENT DOCUMENTS 6,499,029 B1 *  12/2002   Kurapati  ..........  G06F 17/30817
                                                       707/750

* cited by examiner

*Primary Examiner* — Truong Vo
(74) *Attorney, Agent, or Firm* — Hickman Palermo Becker Bingham LLP

(57) ABSTRACT

A user interface for searching records in a database is provided. Each record may contain information regarding one or more categories. The user interface may receive search criteria of one or more categories and provide search results comprising exact and/or inexact matching records. An inexact matching record may have a relevance value representing the relevance of the record to the search query, and inexact matching records may be displayed in an ordering based on the relevance values. The user interface may provide slider tools for receiving changes in a weight value or search criterion of an associated category. A new ordering of the inexact matching records may be displayed in real-time based on newly received weight values or search criterion. The user interface may also provide a mapping tool, a search-result selection function, and/or one or more drill down tools. The user interface may provide any tool or function alone or in any combination.

20 Claims, 12 Drawing Sheets

FIG. 4

USER INTERFACE FOR SEARCH METHOD AND SYSTEM

FIELD OF THE INVENTION

The present invention relates generally to novel methods, apparatus, and computer readable medium for search.

BACKGROUND

The Internet, and particularly the Worldwide Web, has caused a virtual information explosion. An average user, making use of a conventional web browser, now has available to him a mass of information that would have been unimaginable just a few years ago. This includes information available from professional and commercial sources, individuals, Web sites and social networking sites. With the wealth of information that is available over a computer network, technology, implemented as "search engines", attempt to accurately identify specific information sought by users. These search engines, implemented through software programs and computer information systems, are designed specifically to assist users in finding information. Typically, to execute a query, the user submits information or search criteria into one or more fields, and the search engine attempts to identify information that relates to the search criteria entered.

While existing search engines may be adequate for some applications, they are often limited in their ability to uncover useful information. One particular limitation that hinders user efforts to conduct successful searches is that the search engines are sensitive to the terminology of a user in a field of search. Thus, the accuracy and quality of the information retrieved is dependent upon the user's language in the search criteria because there may be useful information available that does not conform to the common terminology. This is particularly true for unstructured searches where a user enters search criterion in a single field, and the search criterion is used to identify information relevant to documents as a whole. In structured searches, a user enters search criteria into predefined fields of the search engine, sometimes with limited ranges of valid search criterion, and then the search engine attempts to identify matching information (e.g., records) that satisfy the user's search criteria. Structured search engines may improve the accuracy and breadth of a search because they focus the search in predefined fields, but these systems still have limitations in their attempt to identify matches desired by the user. The present disclosure sets forth methods, systems, and computer readable medium to improve the accuracy and breadth of information retrieved for users in response to structured search queries.

SUMMARY

A user interface for receiving a search query comprises a set of one or more search criteria of one or more categories for searching a database stored in computer storage. The database may comprise a plurality of records with information. And the user interface may comprise a tool associated with a subset of the one or more categories, with the subset comprising at least one category receiving search criteria. The tool may be configured to receive a change to a weight value of a category within the subset, with the weight change being made by the user graphically manipulating the tool. The user interface may also comprise a search-results section configured for displaying one or more inexact matching records, where an "inexact matching record" may be a record with information that does not exactly match one or more received search criteria of the one or more categories. Such inexact matching records may be given a relevance value that represents the relevance of the inexact matching record to the search query and this relevance value may be based, in part, on weight values associated with the one or more categories. These inexact matching records may also be displayed in an order based on the relevance values. And, if the tool receives a change to a weight value (made by the user graphically manipulating the tool), a new ordering of the inexact matching records may be displayed based on the changed weight value.

In some embodiments, the tool may be a stack comprising the one or more categories of the subset of categories with the user graphically manipulating the stack by selecting a category of the subset and moving the category to a different position in the stack, thereby changing the stack order.

In other embodiments, the tool may be a chart of fixed area and the one or more categories in the subset may be represented by pieces of the chart, with the user graphically manipulating the chart by selecting a piece and changing the area of the piece. A pie chart is an example of such a chart, but similar abilities could be provided by changing the size of layers in a layer-cake, or the like.

In an embodiment, the user interface may receive a search query comprising a set of one or more search criteria of one or more categories for searching a database stored in computer storage. The database may comprise a plurality of records with information. And the user interface may comprise a geographic net tool that provides a user with the ability to graphically define a search criterion comprising a region of the map, and also with the ability to determine whether the record is within that region. This net tool may also provide the user with the ability to graphically modify the defined region, perhaps by moving an existing point on the perimeter of the defined region.

BRIEF DESCRIPTION OF THE DRAWINGS

The foregoing brief description, as well as further objects, features, and advantages of embodiments of the claimed subject matter will be understood more completely from the following detailed description of presently preferred, but nonetheless illustrative embodiments, with reference being had to the accompanying drawings, in which:

FIG. 4 depicts an exemplary screen shot of a user interface implementing user selectable geographic net and weighting tools after the user has chosen to enlarge the perimeter of a geographic net.

DETAILED DESCRIPTION

Figure 1:
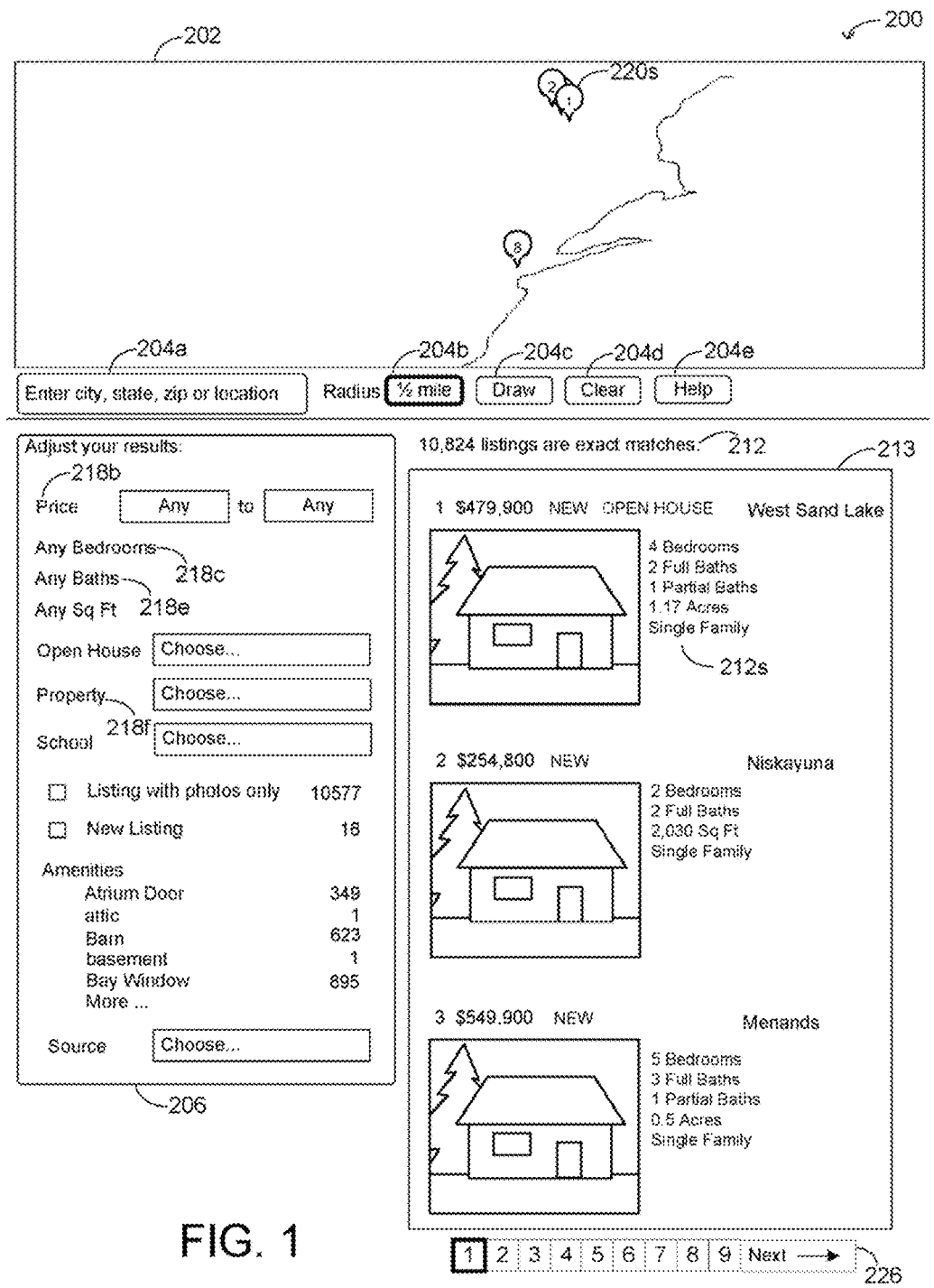
FIG. 1 depicts an exemplary screen shot of a user interface presented to a user accessing a real estate service database.

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

In accordance with embodiments of the disclosure, search results are achieved that are broader and more intelligent than basic keyword searching because search results may include items that do not match all of the user's search criteria. That is, in the absence of or in addition to results that would be generated by a Boolean keyword-only search, users may retrieve partial or inexact matches determined, for example, by filters that comprise a set of user-selectable categories and user-selectable weights within the categories. In some embodiments disclosed herein, a search engine may list the results by their decreasing order of relevance as defined by the user's weighting of the selected categories and the degree any specific result matches the selected criteria for those categories. Thus, a record with data that does not exactly match the selected criteria may still be determined to be relevant and listed in the search results, depending upon how close the data in that record is to the selected criteria and how important the category is for the user.

Thus, in some embodiments, the relevance ranking determination represents a determination of how well a record's data matches the true intent of the user. Consequently, to obtain a relevance-ranked result order, the relationships among selected category weight, selected category criteria, and record data, constitute fundamental elements that may be employed by a search interface that also employs fuzzy logic. When using user-defined category weights in a fuzzy match system, a first inexact match, with matches in categories of high user importance but non-exact matches in categories of low user importance, may rank higher than a second inexact match if the second inexact match includes non-exact matches in high user importance categories. In this way, a relevance listing of a first inexact match ranked before a second inexact match may reflect a higher weight selected for categories that match in the first inexact match than for categories that match in the second inexact match. But, conversely, the same relative listing of the two inexact matches may also reflect the fact that the first inexact match contained search criteria that more closely matched records than the second inexact match, even though the second inexact match had one or more matching criteria for categories weighted higher by the user.

In embodiments, a search engine may employ a search that returns relevant information without using text as a match criterion. This may be accomplished by establishing the relevance of existing data by graphically correlating a user's selected criteria with the existing data. Aspects of such embodiments are discussed within regarding FIGS. 1-10.

As a consequence of embodiments of the disclosure, merchants may promote and sell inventory that might otherwise have been overlooked, and conversely users may find information that may otherwise have remained hidden after an overly strict Boolean search. For example employing an embodiment, if a merchant does not have a particular product sought by a user, the search may return relevant, related products of interest to the user. Similarly, in real estate and dating services examples, the user may be provided with relevant results even in the absence of exact matches. And these examples are not meant to be limiting—searches according to embodiments can be directed at essentially anything: messages, discussions, articles, polls, transcripts, or anything else that can be linked to or pulled from a database.

In some embodiments, the search query comprises a set of one or more search categories with one or more criteria specified per category. An embodiment may use such a search query to search a content database and produce and display in a user interface search results comprising zero or more "exact matches" and zero or more "inexact matches." An "exact match" in the content database may comprise a record having information that exactly matches all search criteria specified in the search query. For example, in a real estate search service, if the search query specifies an asking price range of W to X, a zip code of Y, and a property type of Z, an exact matching record would contain an asking price in the range of W to X, a zip code of Y, and a property type of Z. Note, however, that an exact matching record may also contain categories (e.g., a number of bedrooms, number of bathrooms, etc.) that have not been selected by the user (i.e., where the user has not specified search criteria for the category) and still be considered an exact matching record, as long as the categories that are selected by the user (e.g., asking price range, zip code, property type) have specified criteria that are exactly matched by the information in the record.

A "inexact match" in a content database may comprise a record having information that does not exactly match all the search criteria specified in the search query. In some embodiments, an inexact match may comprise a record not exactly matching one or more search criteria, including not exactly matching any of the search criteria of the search query. For example, if the search criteria specifies an asking price range of W to X, a zip code of Y, and a property type of Z, an inexact matching record may contain an asking price above or below the range of W to X, a zip code that is not Y, and/or a property type that is not Z. Or an inexact match may comprise a real estate listing having a zip code of Y, a property type of Z, but have an asking price just above the range of W to X. Thus, inexact matches may comprise records that are close or approximate matches, are not exact matches to any or all of the search criteria, but still have relevance to the search query.

In an embodiment, to avoid displaying every inexact search result, the number of inexact search results displayed is limited to an arbitrary number of inexact search results, where the order of the inexact search results displayed is limited based on a relevance value determined for each result. An embodiment also limits the number of inexact search results displayed using both an arbitrary number limit and a relevance value limit.

The claimed subject matter will best be understood through the detailed description of a number of preferred embodiments. In accordance with one such embodiment, a real estate search service is provided in which persons seeking to sell real estate (sellers) populate a database with information relating to their real estate. Potential buyers (users) can then access that database and provide various search criteria in order to locate potentially acceptable properties. Note that a similar model is applicable for numerous other services, such as dating or employment agency services.

FIGS. 1-10 show exemplary screen shots of a user interface implementing a user selectable geographic net and weighting tools. FIG. 1 is an exemplary screen shot of a user interface 200 presented to a user accessing a real estate service database. The user is presented with a map 202 and a plurality of map options 204a-e. The real estate listings have not yet been filtered, as indicated by there being no value chosen for any field in search options 206 and no boundary or geographic net created within map 202. Thus, match counter 212 above search-results section 213 lists the total sum of the entered real estate listings, which in this example number 10,824. Search-results section 213 lists results in greater detail and comprises a number of pages 226, each of which is linked to a subset of the results.

Map 202 displays balloons, which are arbitrary symbols each, representing a result in search-results section 213. For example, balloon 220s represents result 222s, given the criteria described by search options 206 and the area displayed by map 202. Balloon 220s may be one symbol for an exact match and a different symbol for an inexact match. In FIGS. 1-10, an exact match will be indicated by a balloon with a number, and an inexact match by a gray-filled balloon and a number. Note that, while every balloon represents a result in search-results 213, not every result in pages 226 (i.e., element 226 in FIGS. 1-10) is represented by a balloon on map 202. Rather, only the individual page selected from pages 226 has its results represented on map 202 by a corresponding balloon. Regarding search options 206, the user is presented with a plurality of fields with which the user may further define a desired listing. For example, the top three fields within search options 206 relate to price 218b, bedrooms 218c, and baths 218e. A user need not make a selection in every field of search options 206, but only those fields the user considers important. With the making of any selection, the search may be performed automatically.

Figure 2:
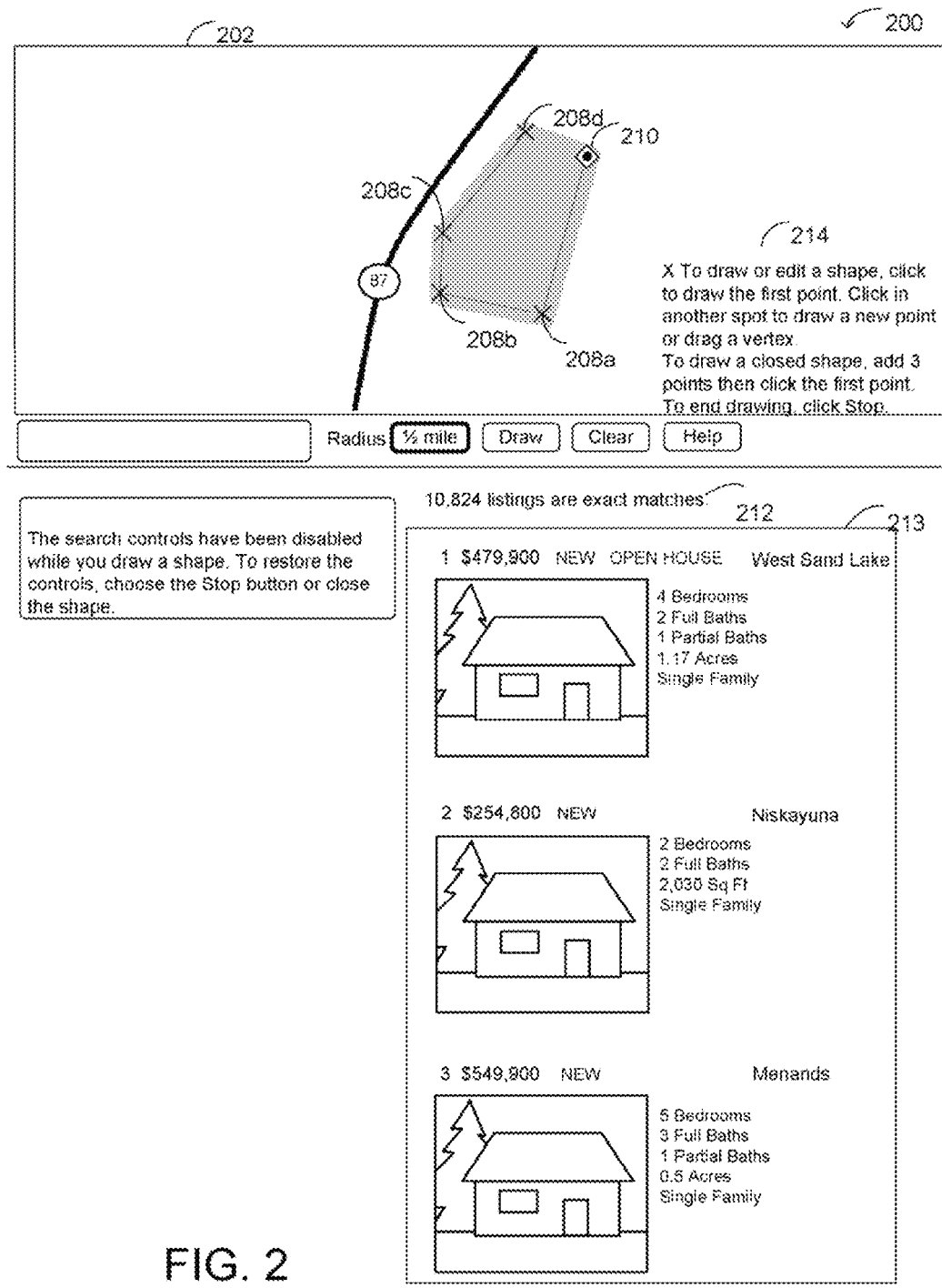
FIG. 2 depicts an exemplary screen shot of a user interface with a draw option for a search.

Turning to FIG. 2, in an embodiment, choosing draw option 204c provides the user with control of a single cursor "+" (not shown) via a mouse, touchpad, or suitable control device. The user is also presented with directions 214 that instruct the user regarding how to create a geographic net. The user may then re-center map 202 by using the cursor and mouse to drag the desired general geographic region into the center of map 202. The user may also increase or decrease the scale of map 202 using zooming buttons (not shown) to one side of map 202. With the desired geographic region centered, the user may then use the cursor to define a subset of the desired geographic region in the following manner. The user positions the cursor at a first location on the perimeter of the desired subset and fixes an "x" (not shown) at starting point 210. The fixing is accomplished with a left-click of a mouse, or a tap on a touch pad, etc. The user interface responds by placing a shaded "x" (not shown) at starting point 210. The user then proceeds to a second location on the desired perimeter and fixes a second point, e.g., point 208a. The user interface responds by placing a second shaded "x" at the chosen spot and connecting the first and second points with a line. The user then proceeds to a third location on the perimeter and fixes a third point 208b. The user interface responds by placing a third shaded "x" at the chosen spot and connecting the second and third points with a line. After the third point 208b is fixed, in this embodiment, the user interface also changes the "x" at the starting point 210 into a diamond as shown at starting point 210. The significance of the diamond is that, in this embodiment, the user now has the option to close the perimeter by locating the cursor on top of starting point 210 and fixing the final point on top of starting point 210. However, rather than closing the perimeter after fixing third point 208b, the user also has the option to add more points to further define the perimeter. As shown, the user has chosen to add fourth and fifth points 208c and 208d. This has created an incomplete boundary, a u-shaped region, but has not yet resulted in any filtering of the search results, as indicated by there being no change to match counter 212, which remains at 10,824.

Figure 3:
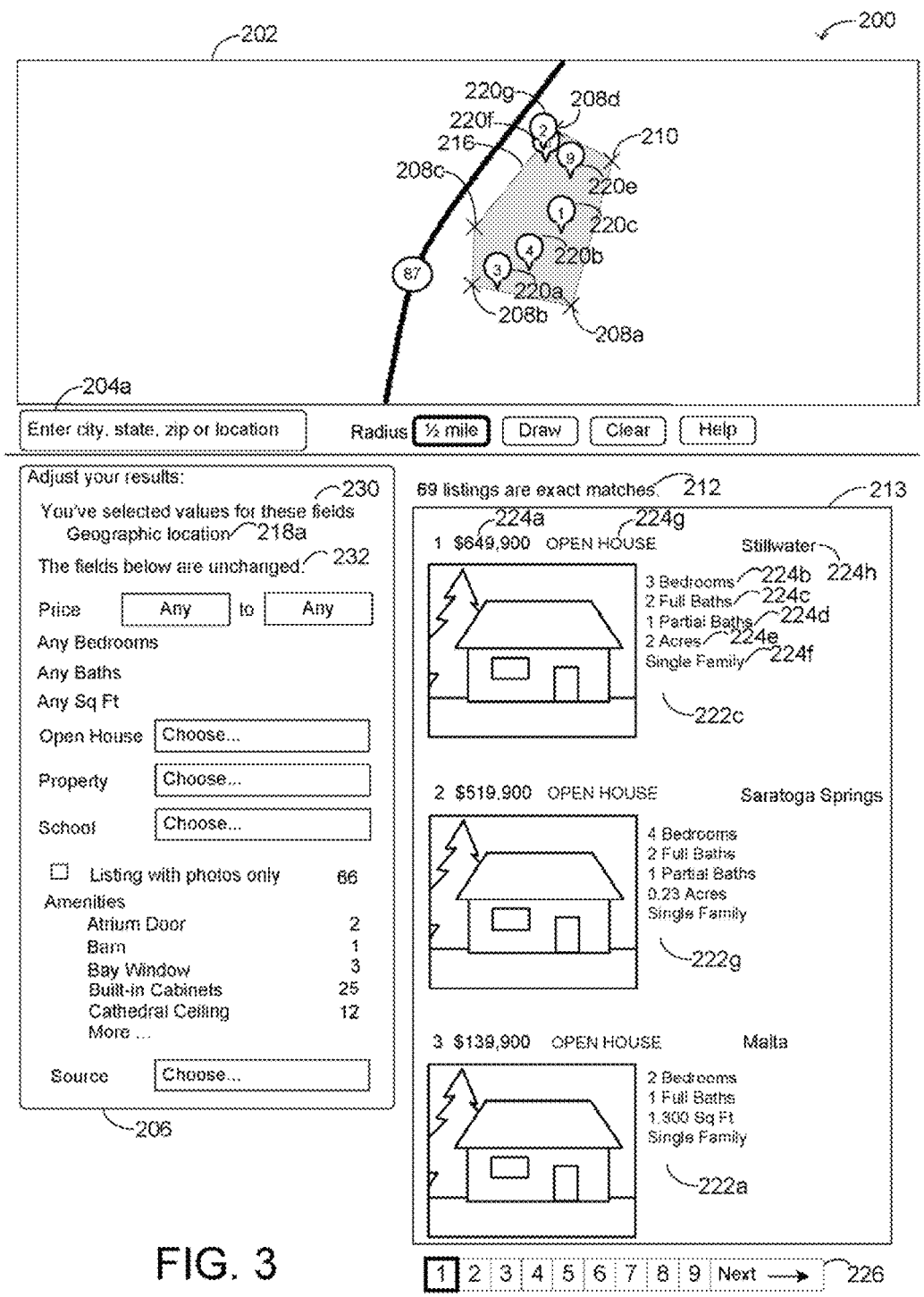
FIG. 3 depicts an exemplary screen shot of a user interface implementing user selectable geographic net and weighting tools.

FIG. 3 depicts an exemplary screen shot of a user interface implementing user selectable geographic net and weighting tools after the user has chosen to close the perimeter of the geographic net 216 by fixing the sixth point on top of starting point 210. In FIG. 3, completing the perimeter of geographic net 216 has resulted in the following changes. First, it has defined a geographic region bounded by geographic net 216 within which a real estate property must be located to be an exact search match. Second, within geographic net 216 a limited number (set at ten in this embodiment) of exact matches are indicated by balloons 220a-j (not shown: balloons 220d, 220h, 220i, and 220j), which correspond to results 222a-j within search-results 213 (although only 222a, 222c, and 222g are shown). Note that four of the ten exact matches do not appear to have corresponding balloons because of the scale of map 202 has caused balloons to overlap. Should the map be expanded sufficiently, the overlapped balloons would eventually become visible. Third, search options 206 and area option 204a are again visible. Within search options 206, geographic location 218a now appears as the single category for which "You've selected values for these fields," or fields 230. Fourth, match counter 212 has been updated to indicate that 69 listings are exact matches. That is, 69 listings are found within geographic net 216. And fifth, results 222c, 222g, and 222a, displayed in search-results section 213, now describe the top search results, (i.e., real estate listings that are within geographic net 216). For this embodiment, results 222c, 222g, and 222a include data fields 224a-i for asking price 224a, bedrooms 224b, full bathrooms 224c, partial bathrooms 224d, lot size 224e, dwelling type 224f, viewing options 224g, location 224h, and photo 224i. Note that only the top three search results are depicted for clarity. For this embodiment, results 222c, 222g, and 222a are within a scrollable window that contains all ten of the top exact matches. Additional exact matches followed by weighted results of inexact matches may be found in similar scrollable windows (not shown) on pages 226. In an embodiment, the user may now click on or otherwise select results 222c, 222g, and 222a, and also the other results in pages 226, to access additional data for that listing, (e.g., additional pictures, a floor plan, etc.).

Figure 4:
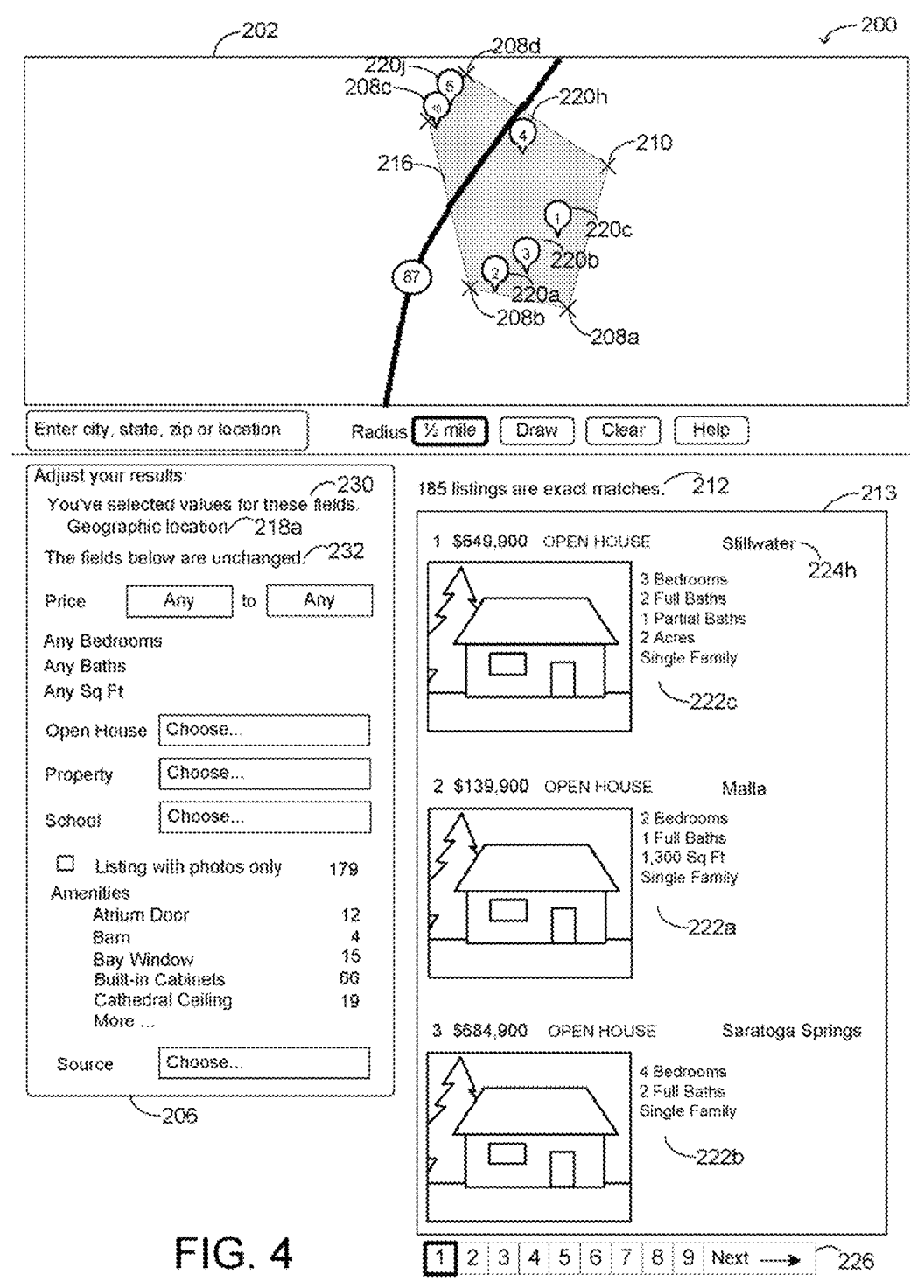

Now regarding FIG. 4, which depicts an exemplary screen shot of a user interface implementing user selectable geographic net and weighting tools after the user has chosen to enlarge the perimeter of the geographic net 216. In an embodiment, geographic net 216 can be altered by the user to arbitrarily define a new subset of the geographic region displayed in map 202. To accomplish this, the user may click and drag any of points 210, 208a-d to a new location. Alternatively, the user may choose to click on clear 204d, which would erase points 210, 208a-d, and allow for a completely new geographic net to be constructed. As shown, the user has enlarged geographic net 216 by dragging point 208c and point 208d to new locations across Interstate 87. This enlargement of the geographic net resulted in an increase to 185 listings in match counter 212. It also resulted in a different order for results 222c, 222g, and 222a. That is, in FIG. 3, the top three results were results 222c, 222g, and 222a, but in FIG. 4, after enlarging geographic net 216, result 222a has moved up to second place and result 222b has moved from fourth (not shown) to third. Correspondingly, result 222g has dropped from second and is not shown in FIG. 4, and neither is its corresponding balloon 220g (FIG. 3), meaning that result 222g is no longer in the top ten. With the enlargement of the geographic net 216, there is, however, no change to search options 206 and geographic location 218a is still the only category listed under fields 230 for which values have been selected.

By fine-tuning geographic net 216, either by dragging and dropping points 210, 208a-d, or by clearing and creating a new geographic net, the user may define a desired geographic location with a precision limited by the resolution of the underlying map. In addition, by exploring the listings on other pages 226, the user will eventually be provided with listings that are close to, but not within, geographic net 216 (i.e., inexact matches). Thus, once the user explores page 19 (not shown) the last five of the 185 exact matches 212 will be shown and closest matches 1-5 (not shown) will follow on page 19 (not shown). Subsequent pages will display only inexact matches. The embodiment is therefore able to locate matches that are close, but not exact. In the embodiment, the closest matches 1-5 on page 19 (not shown) and other inexact matches are listed in decreasing order of relevance as weighted by the user's selected fields 230. In the embodiment, on map 202 the closest matches are indicated by gray-filled balloons, while exact match balloons are white. Of course, such differences may be indicated by color or shape or other (such as cross-hatching) differences. Also, once closest matches 1-5 are viewed by the user, should the user wish to see more listings near those closest matches the user can simple drag and drop any of points 2008a-d so that geographic net 216 encompasses the closest match of interest. At that time, the closest match of interest will become an exact match and, potentially, so will nearby properties. Similarly, geographic regions can be excluded by contracting geographic net 216.

Figure 5:
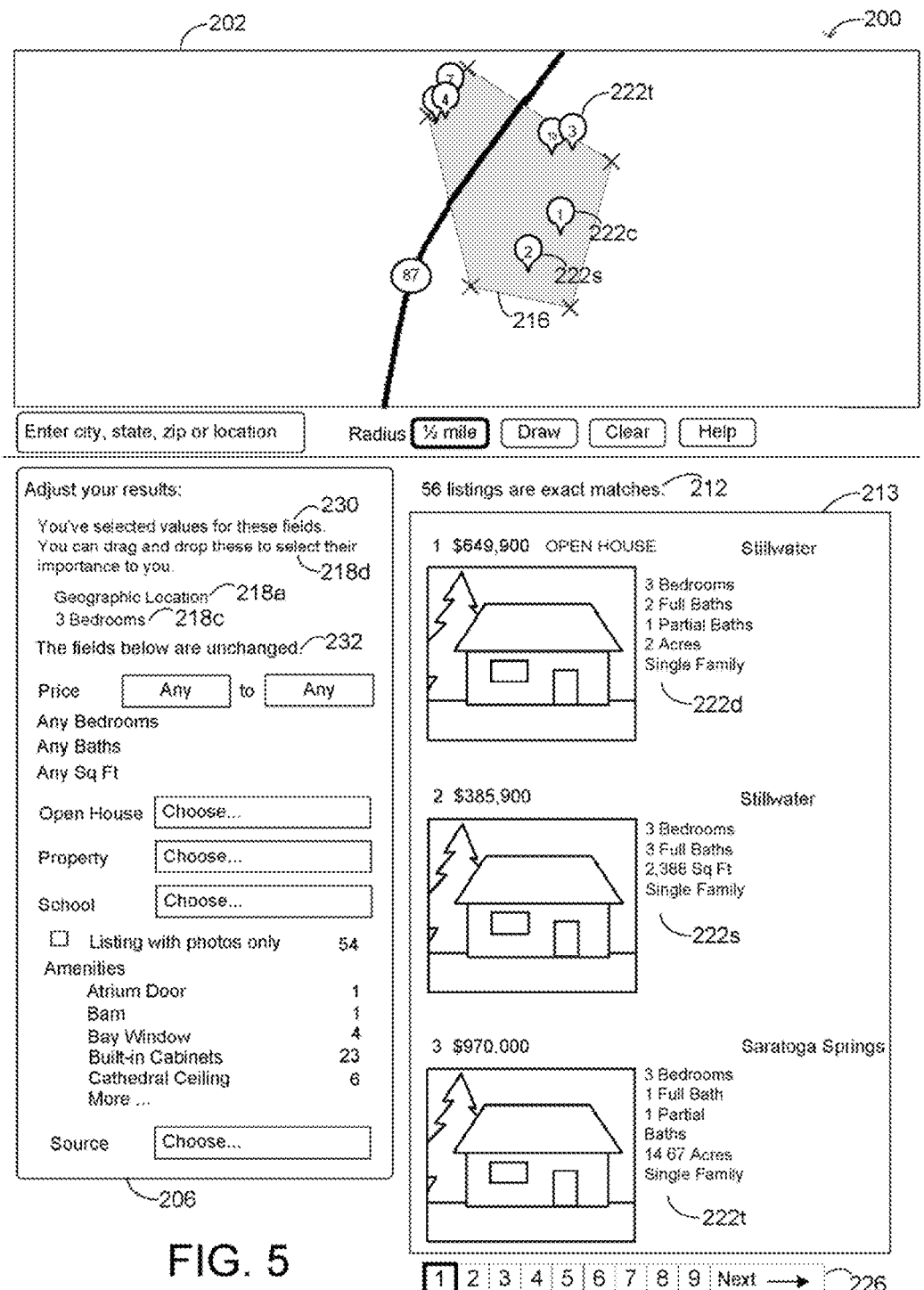
FIG. 5 depicts an exemplary screen shot of a user interface implementing user selectable geographic net and weighting tools after the user has chosen to add bedrooms to the fields for which values have been selected within the search options.
Figure 6:
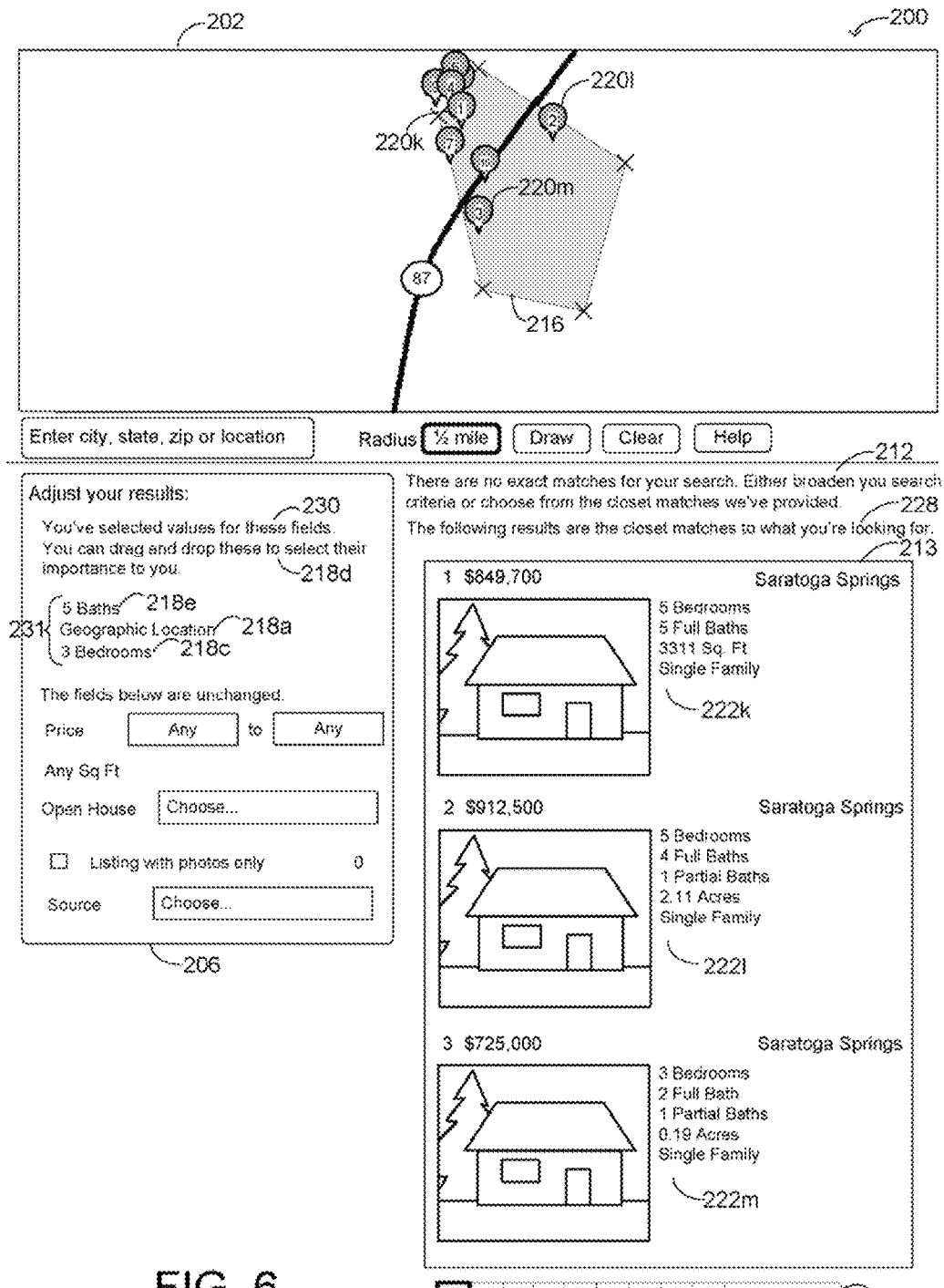
FIG. 6 depicts an exemplary screen shot of a user interface after the user has chosen to add baths to the fields for which values have been selected within the search options.

Now regarding FIG. 5, which depicts an exemplary screen shot of a user interface implementing a user selectable geographic net and weighting tools after the user has chosen to add bedrooms 218c to fields 230 for which values have been selected within search options 206. In some embodiments, the choice of a number of bedrooms 218c can be made with a slider for providing a range of options (not shown), or by typing a number into a data field (not shown). In FIG. 5, a slider (not shown) for bedrooms 218c was set to 3 bedrooms. This resulted in bedrooms 218c being moved into fields 230 from unchanged fields 232. In this embodiment, the order within fields 230 is first determined by the order in which a value was selected for a given field. The ordering within fields 230 may be referred to as the stack 231 (FIG. 6). The displayed order within stack 231 determines the relative weighting of the value within the search algorithm. For the current example, geographic location 218a was selected first, so it is the first field in fields 230. With the selection of values for a second field, namely bedrooms 218c, that second field was added to fields 230 below geographic location 218a. Thus, for this embodiment, the search algorithm weights geographic location 218a more than bedrooms 218c because geographic location 218a is located higher within stack 231. The selection of values for bedrooms 218c has also caused other changes in interface 200. That is, there are now 56 exact matches 212. Also, result 222a and result 222b have been replaced in the top three by result 222s and result 222t. With the selection of a particular number for bedrooms 218c, another option appeared within search options 206, namely weighting option 218d stating: "You can drag and drop these to select their importance to you."

Thus, in FIG. 5, geographic location 218a is weighted more heavily during the search than bedrooms 218c, but in an embodiment, by dragging and dropping bedrooms 218c above geographic location 218a their relative weights may be changed according to their relative positions within stack 231 (FIG. 6).

FIG. 6 depicts an exemplary screen shot of a user interface implementing user selectable geographic net and weighting tools in which the user has chosen to add baths 218e to fields 230 for which values have been selected within search options 206. In an embodiment, stack 231 is structured so that dropping one field directly on top of another makes both fields of equal weight. In an embodiment, each position in stack 231 has a user-definable weight. Note that though stack 231 is depicted as vertical, embodiments have stack 231 configured horizontally, or in other arrangements that indicate priority, such as layering, tabbing, or indenting the categories. In addition, though not shown, a slider for providing a range of options for a field may be made to appear by causing a cursor to hover over that option, e.g., by causing a cursor to hover over bedrooms field 218c a sliding may appear that allows the user to select a number of bedrooms.

In FIG. 6, upon selecting a value for baths 218e, baths 218e would have been placed below bedrooms 218c in fields 230, but the user has chosen to weight baths 218e higher by dragging and dropping baths 218e above geographic location 218a. The selecting of the specific value "five" for baths 218e has caused the following changes. Exact matches 212 now reads: "There are no exact matches for your search. Either broaden your search criteria or choose from the closest matches we've provided." In other words, there are no exact matches within that geographic net 216 with five baths and three bedrooms. Beneath exact matches 212 there is a closest matches 228 reading "The following results are the closest matches to what you're looking for." It should be noted that closest matches 228 is not new to this search pattern. Rather, with the previous searches, closest matches 228 followed the last of the exact matches. So, for example, in FIG. 5, closest matches 228 followed the $56^{th}$ and last exact match. Thus, embodiments are able to locate matches that are close, but not exact. The results are listed in decreasing order of relevance as defined by the user's selected criteria and weighting. The displaying of results with more bathrooms above those with fewer bathrooms reflects the preference within baths 218e for 5 bathrooms. And, though not shown, the displaying of results with the desired number of bathrooms above those with the desired number of bedrooms reflects the higher weighting imposed on the baths 218e field than on the bedrooms 218c field. In FIG. 6, none of results 222*a-c*, 222*g*, 222*s*, or 222*t* (depicted in FIGS. 1-5) had five baths. According to this embodiment, the closest matches are now results 222*k*, 222*l*, and 222*m*, with corresponding balloons 220*k*, 220*l*, and 220*m*.

Figure 7:
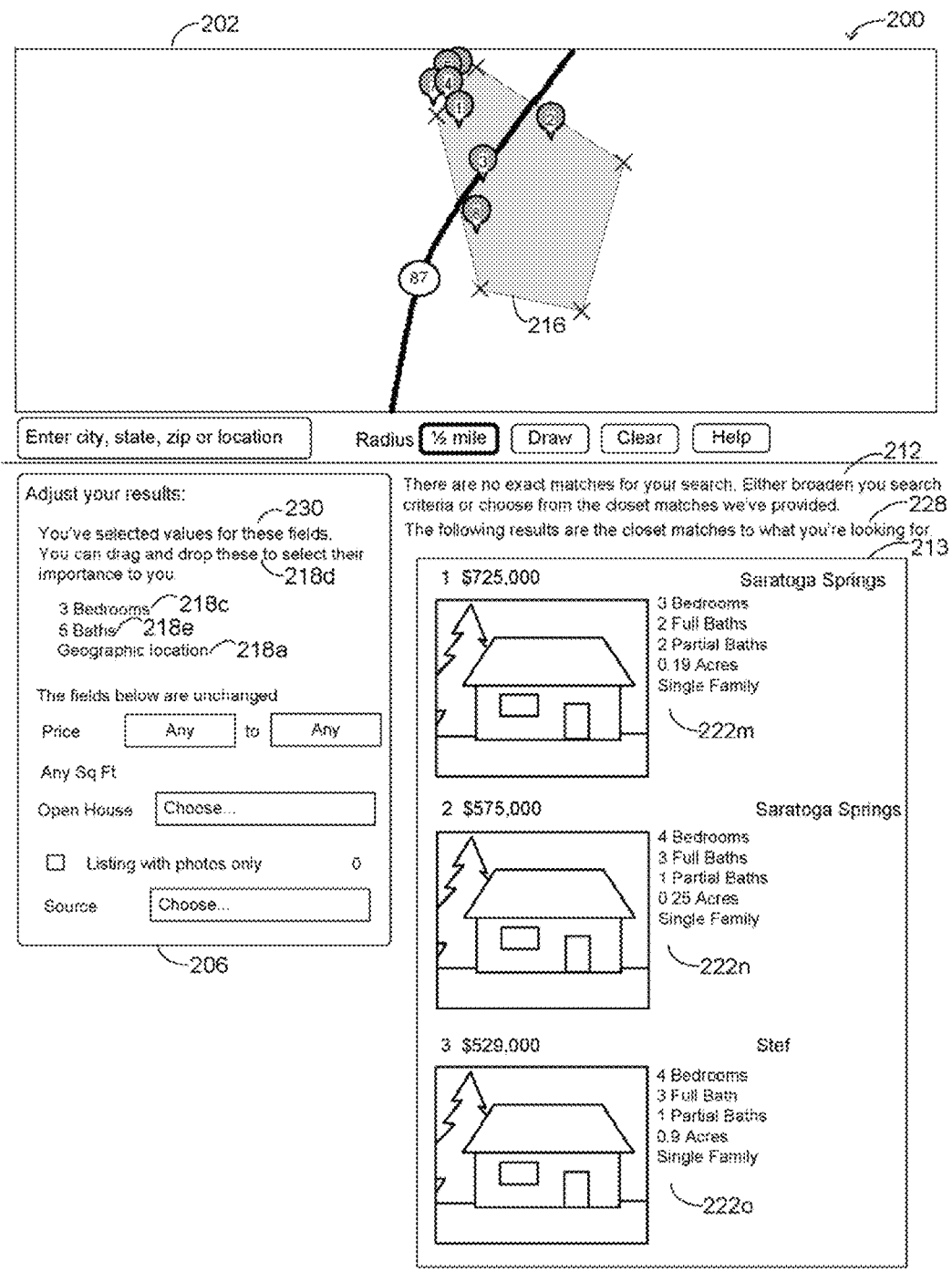
FIG. 7 depicts an exemplary screen shot of a user interface after the user has changed priorities by dragging the bedrooms field from below both the geographic location and the baths fields.

In FIG. 7, the user has changed priorities by dragging bedrooms 218*c* from below both geographic location 218*a* and baths 218*e*, to the top of fields 230 in FIG. 7. In doing so, the system has re-ordered the results that follow closest matches 228. After that re-ordering result 222*m* has moved from the third to the first closest match. Similarly, results 222*n* and 222*o* have moved from lower in the order to the second and third closest matches, bumping result 222*k* and 222*l* (both FIG. 6) from the top two positions. Balloon 220*m* (corresponding to result 222*m*) is now labelled "1," balloon 220*n* (corresponding to result 222*n*) is now labelled "2," and balloon 220*o* (corresponding to result 222*o*) is now labelled "3." Balloons 220*k* and 220*l* still remain and are labeled "4" and "5," respectively. Thus, with the re-ordering the weighting of fields 230 by the user, the embodiment has provided a different list of closest matches 228. And, even if there had been an exact match, this embodiment would still have provided a list of closest matches 228 following the list of exact matches 212, as it did with the searches discussed in FIGS. 1-5, though those closest matches 228 were contained further down within pages 226.

Figure 8:
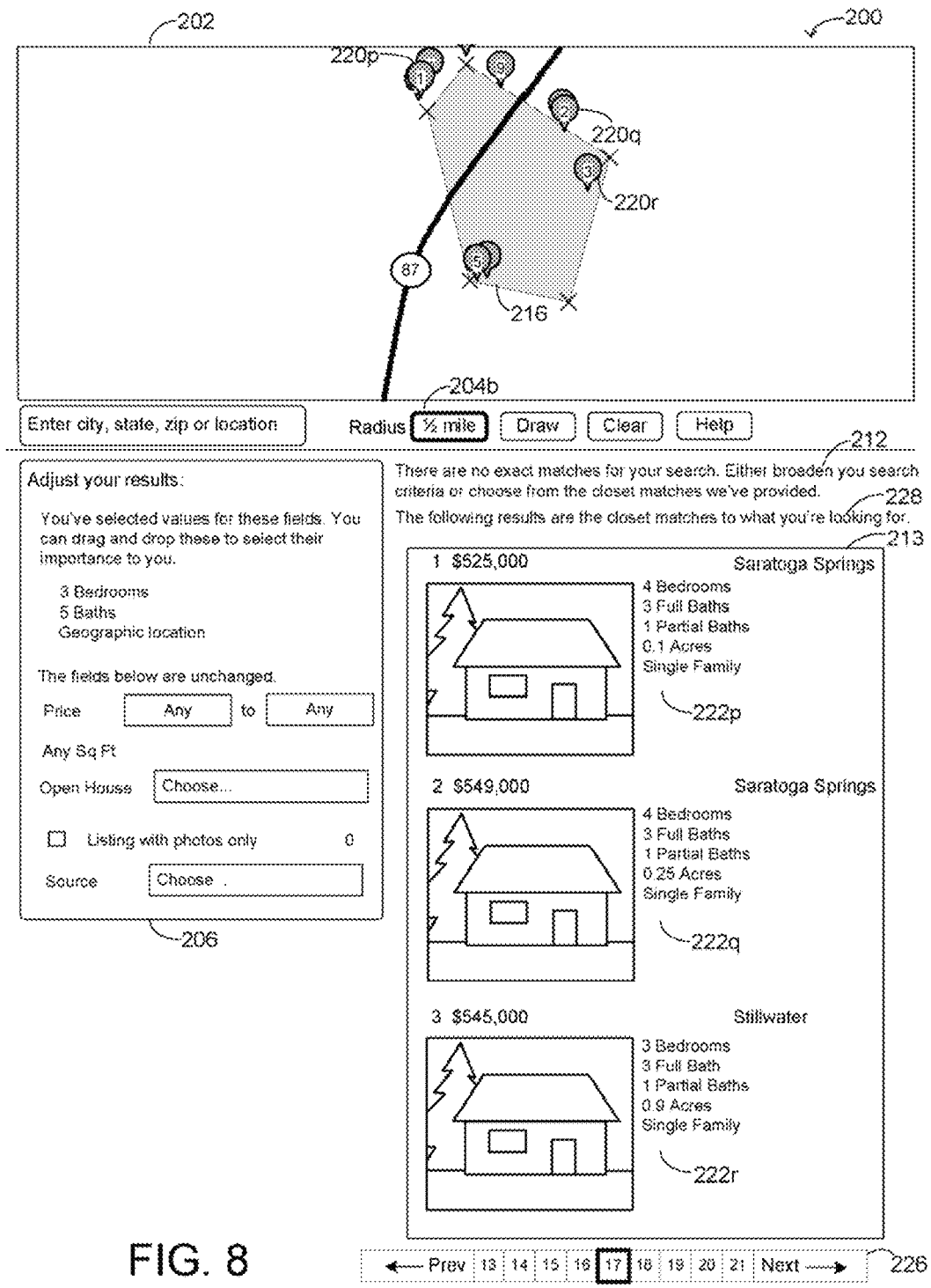
FIG. 8 depicts an exemplary screen shot of a user interface after the user has chosen to inspect a specific search page.

FIG. 8 depicts an exemplary screen shot of a user interface 200 implementing user selectable geographic net and weighting tools. In FIG. 8, the user has chosen to inspect page 17 of pages 226. Page 17 of pages 226 is illustrative of how closest matches 228 reflects the choice of geographic location 218*a*. Result 222*p* with corresponding balloon 220*p* appears to be outside of geographic net 216. Yet result 222*p* is listed above result 222*q*, which with corresponding balloon 220*q* is clearly within geographic net 216. Since both result 222*p* and result 222*q* have the same number of bedrooms and baths, so, and since result 222*q* is within geographic net 216, it may appear that result 222*q* should precede result 222*p* in the list. However, radius 204*b* is set to a half-mile. Radius 204*b* therefore extends geographic net 216 an additional half-mile from the perimeter shown. Thus, result 222*p* is still within geographic net 216, though that may not be initially obvious from the figure. It is therefore consistent for result 222*p* to precede result 222*q*.

Figure 9:
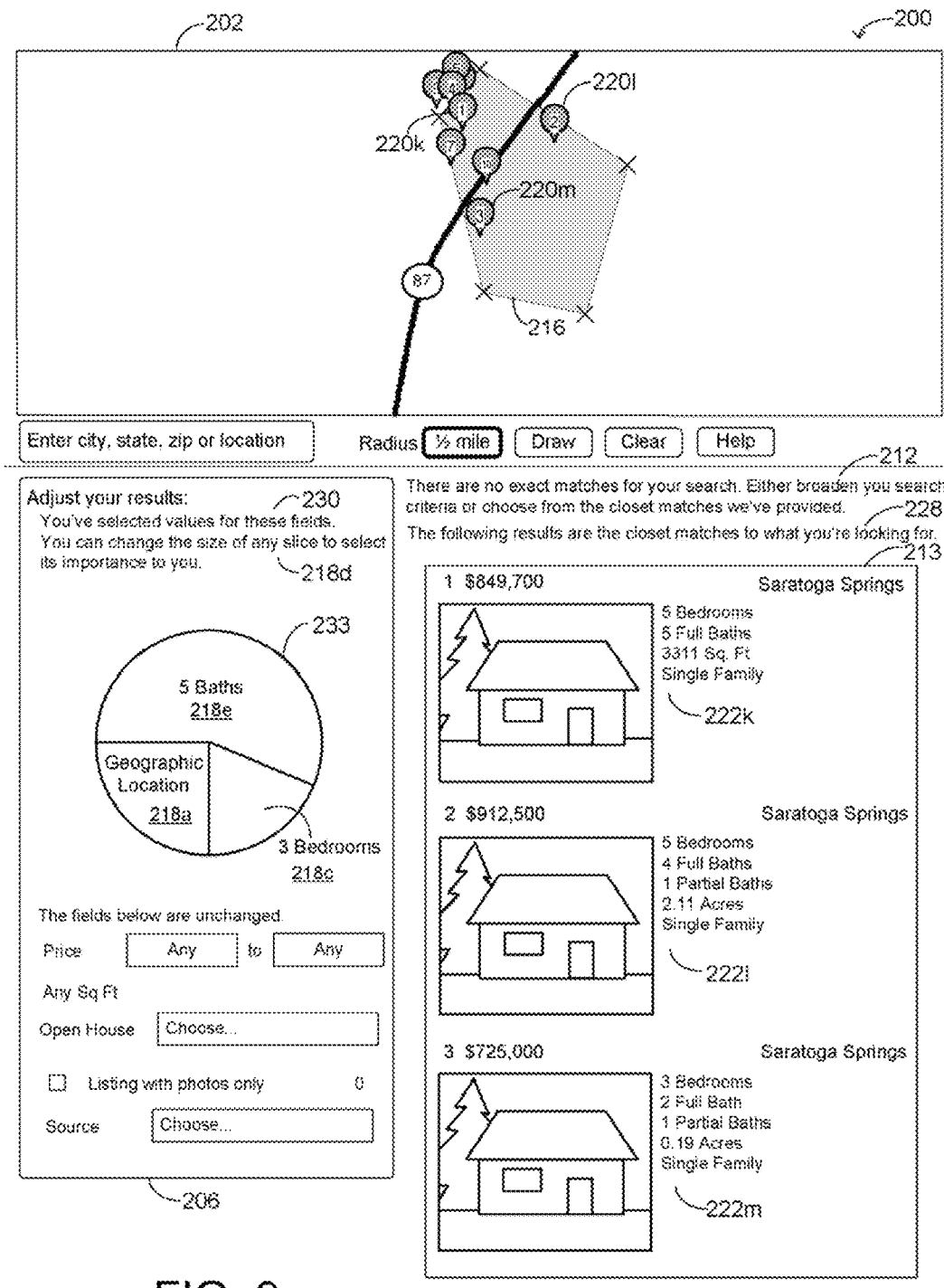
FIG. 9 depicts an exemplary screen shot of a user interface that uses a pie chart to select weights for the categories.

FIG. 9 depicts an exemplary screen shot of a user interface implementing user selectable geographic net and weighting tools. Here, as in FIG. 6, the user has chosen to add baths 218*e*, bedrooms 218*c*, and geographic location 218*a*, to fields 230 for which values have been selected within search options 206. But in this embodiment, the selected fields have been displayed in a pie chart 233. In this embodiment, the user is able to change the weights of the selected fields 230 by manipulating the sizes of the slices in pie chart 233, with a larger slice correlating to a higher weight. Upon selecting values for bedrooms 218*c*, baths 218*e*, and geographic location 218*a*, each field is initially given an equal share of pie chart 233. In FIG. 9, however, baths 218*e* has been expanded to increase its weight. This change to the weight given baths 218*e* subsequently affected the weights affected both bedrooms 218*c* and geographic location 218*a*. To accommodate the increased share of the pie given baths 218*e*, and since pie chart 233 did not change in size, in the embodiment both bedrooms 218*c* and geographic location 218*a* had their respective pie slice sizes equally reduced, though it is envisioned that enlarging one slice may affect only a single other slice, perhaps by moving a "cut" line. In FIG. 9, and as occurred similarly in FIG. 6, the selecting of the specific value "five" for baths 218*e* has caused the following changes. First, exact matches 212 now reads: "There are no exact matches for your search. Either broaden your search criteria or choose from the closest matches we've provided." In other words, there is no exact match within that geographic net with five baths and three bedrooms. Second, beneath exact matches 212 closest matches 228 now reads: "The following results are the closest matches to what you're looking for." As with FIG. 6, it should be noted that closest matches 228 is not new to this search pattern. Rather, with the previous searches, closest matches 228 followed the last of the exact matches. So, for example, in FIG. 5, closest matches 228 followed the 56$^{th}$ and last exact match. Embodiments are therefore able to locate close, but not exact, matches. Third, the results are listed in decreasing order of relevance as defined by the user's selected criteria and the weight given each criterion. The displaying of results with more bathrooms above those with fewer bathrooms reflects the preference within baths 218*e* for five bathrooms, with that preference determined by bathrooms 218*e* being represented by a larger slice of pie chart 233 than either geographic location 218*a* or bedrooms 218*c*. And, though not shown, results are displayed with the results having the desired number of bathrooms above those with the desired number of bedrooms: reflecting the higher weighting selected for baths 218*e* compared to bedrooms 218*c*. In FIG. 6, none of results 222*a-c*, 222*g*, 222*s*, 222*t* (depicted in FIGS. 3-5) had five baths. According to this embodiment, the closest matches are now results 222*k*, 222*l*, and 222*m*, with corresponding balloons 220*k*, 220*l*, and 220*m*.

Figure 10:
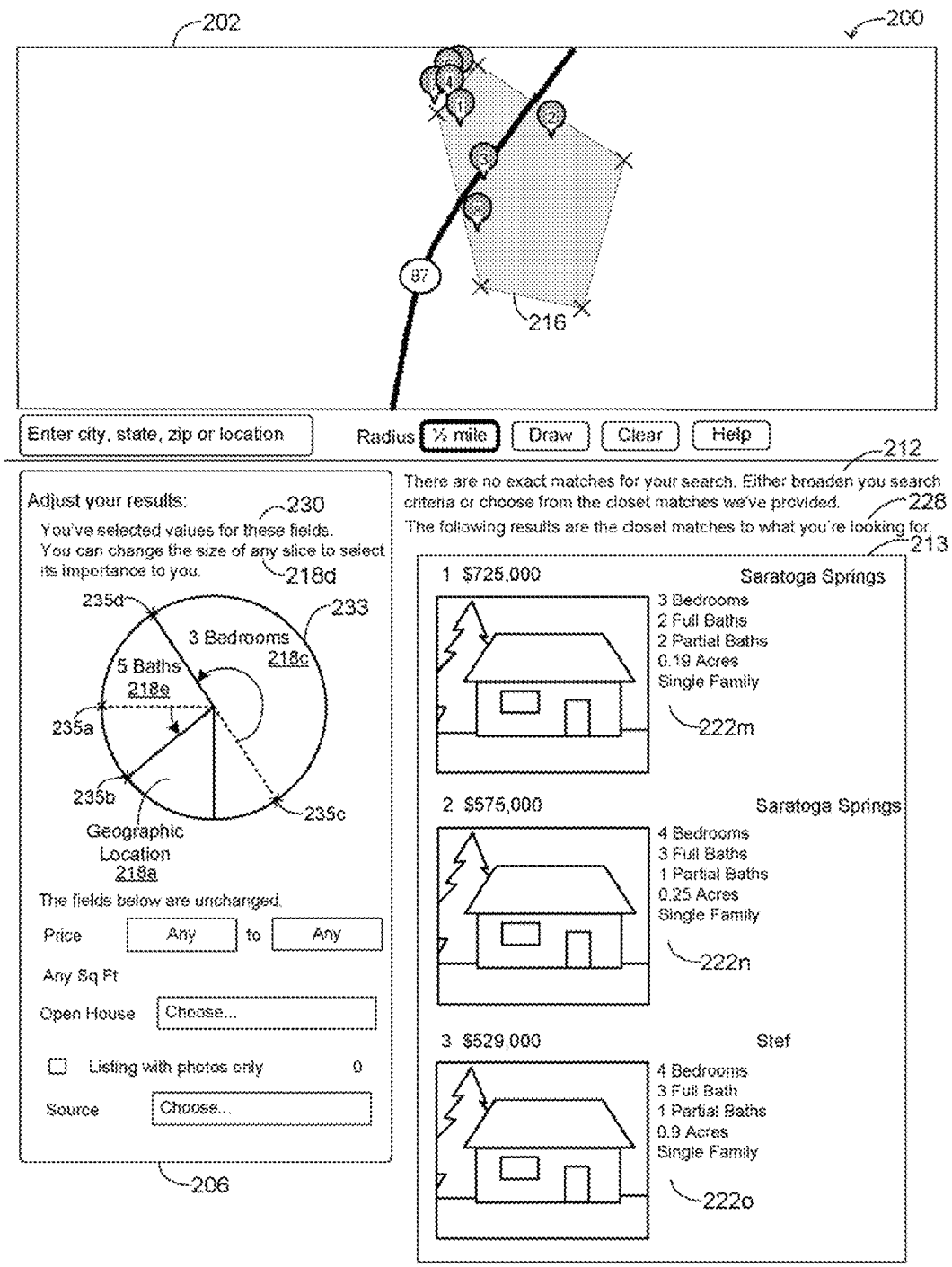
FIG. 10 depicts an exemplary screen shot of a user interface with changes to the sizes of the slices of the pie chart from the embodiment of FIG. 9.

FIG. 10 depicts an exemplary screen shot of a user interface with changes to the sizes of the slices of the pie chart from the embodiment of FIG. 9. In FIG. 10, the user has changed priorities by changing the sizes of the slices. As shown, a corner of the slice representing baths 218*e* has been moved from initial point 235*a* to point 235*b*. In addition, a different corner of the slice representing baths 218*e* has been moved from initial point 235*c* to point 235*d*. The result of both these movements is that the slice representing bedrooms 218*c* is now larger than either other slice, and so bedrooms 218*c* is weighted more than the other two. The movement from initial point 235*a* to 235*b* also significantly decreased the size of the slice representing geographic location 218*a* and had a corresponding impact on its weight. The movement from initial point 235*c* to point 235*d* and from initial point 235*a* to 235*b* also combined to decrease the size of the slice representing baths 218*e*, and had a corresponding impact on its weight. Thus, as a result of the two corner movements, the weights of the three fields have changed. As is visible from the size of the slices: bedrooms 218*c* has moved from least weight to highest weight; baths 218*e* has moved from highest weight to intermediate weight; and geographic location 218*a* has moved from intermediate weight to least weight. In doing so, the user interface of the embodiment has re-ordered the results that follow closest matches 228. Re-ordering, in fact though not shown, followed the movement of each point: 235*a* to 235*b*, and 235*c* to 235*d*. Now result 222*m* has moved from third to first closest match. Similarly, result 222*n* and result 222*o* have moved from lower in the order to second and third closest match, bumping results 222*k* and 222*l* (both FIG. 6) from the top two positions. Balloon 220*m* (corresponding to result 222*m*) is now labelled "1," with balloon 220*n* now labelled "2" and corresponding to result 222*n*, and balloon 220*o* now labelled "3" and corresponding to result 222*o*. Balloons 220*k* and 220*l* still remain and are labeled "4" and "5," respectively. Thus, with the re-ordering of the weighted fields 230 by the user changing the relative sizes of the slices on pie chart 233, the embodiment has provided a different list of closest matches 228. In addition, if there had been an exact match, this embodiment of the system would again have provided a list of closest matches 228 following the list of exact matches 212, as it did with the searches discussed in FIGS. 1-5, though closest matches 228 of FIGS. 1-5 were contained further down the list of pages 226. Note that, given the pie has a fixed circumference, changing a slice's size is a zero-sum game: the enlarging of the slice representing bedrooms 218c can also be seen as the sum of the decrease of the slice representing geographic location 218a and the decrease of the slice representing baths 218e. In an embodiment, moving a corner of a slice has no effect on any other corner on any other slice. However, embodiments are envisioned in which moving a corner on one slice would cause the corners of other slices to move, i.e., increasing the size of one slice would simultaneously decrease the size of all other slices, either with each slice decreasing in size by the same amount, or by each slice decreasing in size by the same proportion. In an additional embodiment, the weights of the fields represented by slices within pie chart 233 may be changed by moving center point 235e and in that manner changing the area of the pie slices. In a further embodiment, the functions described using pie chart 233 are performed in other geometries, e.g., a layer-cake. That is, with a layer-cake embodiment, each layer of a cake would represent a chosen field and the weights given those fields would be adjusted by changing the thickness of the layer.

Now returning briefly to FIG. 1, in an embodiment, if the user enters a city, state, zip code, or location (such as the names of two intersecting streets) in area option 204a and chooses a radius in radius option 204b, then in map 202 a shaded region of the chosen radius (not shown) will appear centered about the chosen location. Subsequently, the user may adjust the results using search options 206, as was previously explained. Search-results section 213 may comprise exact matches, inexact matches, or both. An exact match may comprise a real estate listing containing information that exactly matches all specified search criteria. An exact match may also contain information regarding categories (e.g. unchanged fields 232 (FIGS. 1c-h)) that are not selected or specified in the search criteria. An inexact match may comprise a real estate listing containing information that does not exactly match one or more specified search criteria, including not matching any of the specified search criteria. For example, an inexact match may have an asking price just above a specified range, but may otherwise match the other search criteria. As a further example, an inexact match may have more or fewer bedrooms than the specified number of bedrooms, but may otherwise match the other search criteria. As another example, an inexact match may be located outside of the desired geographic region, but may otherwise match the other search criteria. Thus, the inexact matches may comprise real estate listings that do not exactly match the search criteria, but are close or approximate matches to the search query and still have some relevance to the search. In an embodiment, a user interface may show inexact matches listed in an order (in the search-results section 213) based on the relevance of the inexact match to the search criteria. In some embodiments, a user interface shows inexact matches listed in decreasing order of relevance to the search criteria. In some embodiments, search methods discussed herein may be used to determine a relevance value for each record in a database, the relevance value representing the relevance/closeness of the record to the search criteria. As discussed herein, the various categories of search criteria may each have an associated weight value indicating the importance of a particular category. The relevance value determined for a record may be based, in part, on the weights associated with the various categories of search criteria.

Figure 11:
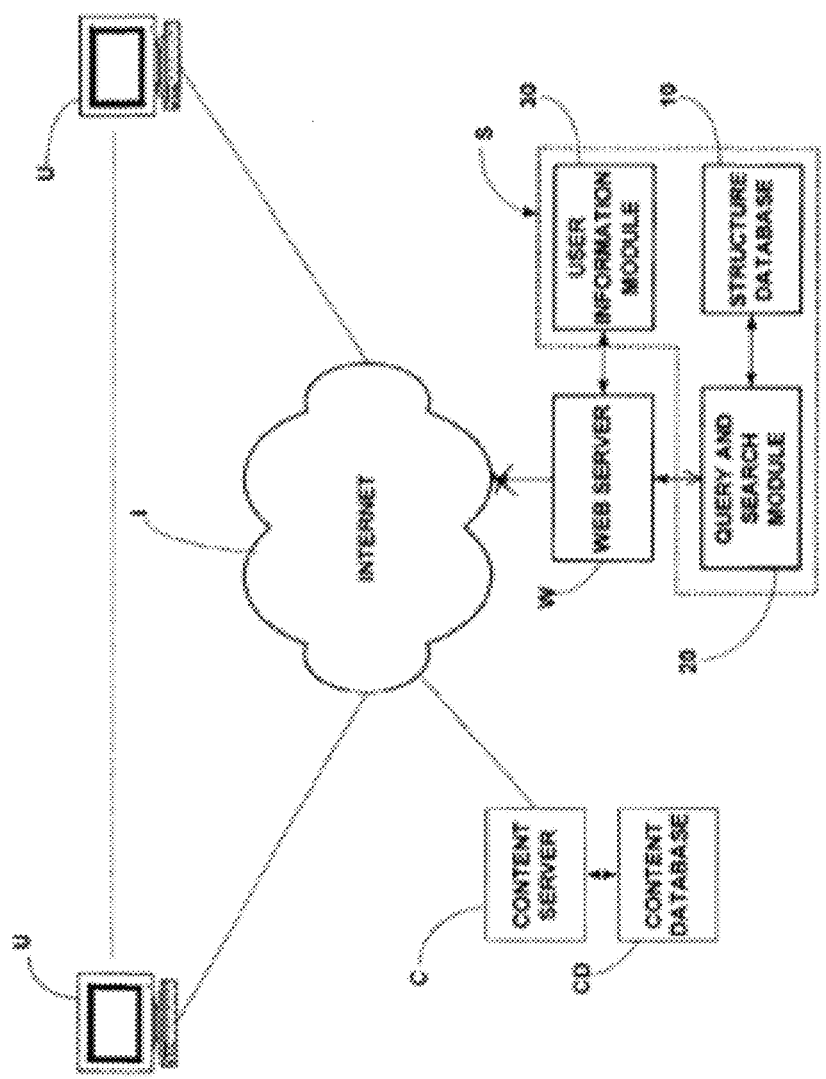
FIG. 11 is a functional block diagram illustrating a preferred environment.

FIG. 11 is a functional block diagram illustrating the preferred environment for an embodiment. In FIG. 11, a plurality of users' computers U accesses a content server C via a network I, preferably the Internet. Server C provides users U access to a content database CD. Database CD may provide various types of information. For example, it may maintain the information used by an online dating service or a real estate brokerage. Alternatively, it could provide the information for a restaurant survey service or wine survey service, or numerous other special interest services. Database CD could also include, in addition to surveys, product reviews and articles of interest on various subjects.

Also, according to an embodiment, network I is connected to a web server W which cooperates with a system S to manage users' access to information in database CD. Within system S a query and search module 20 interfaces with users, permitting them to formulate requests for information from database CD. Within system S, a module 20 creates, manages and maintains a structure database 10, which contains information describing the structural relationship between various pieces of information in database CD. Structure database 10 also contains information relating to the structural relationship between various portions of information in a query. The information may be contained in a format comparable to the structural relationship of information in database CD.

In an embodiment, information in structure database 10 is used to correlate the data structure of a query to the structure of database CD, in order to determine the information in database CD that needs to be provided to a user in response to a query. Structure database 10 may retain information regarding the structure of each category of a record. Server W then connects the user to server C, with instructions to server C regarding the information that is to be provided to the user from database CD.

User inputs defining a search query may be received through a user interface. In some embodiments, user input comprises search criteria (for various categories) specified by a user, e.g., as specified through selected filter criteria, selected categories, selected multiple-choice menus, selected values, selected ranges, etc. The search criteria specified by a user may be used as inputs to the query and search module 20 to determine relevant records in content database CD. Server W then connects the user to server C, with further instructions to server C regarding what information is to be provided to the user from database CD.

In an embodiment, the functions of servers C and W could be combined in a single server. Alternatively, server W and system S could accommodate access to different, independent content databases CD relating to different subject matter. The user could thereby be offered access to information in a plurality of databases of different content through a single query generated via web server W.

In an embodiment, every piece of content in an exemplary system is tagged with a set of weighted categories. A query made to the system is also translated into a set of weighted categories. The system assigns a numerical value to the degree of similarity (or difference) between these two sets of weighted categories through the use of the following "Similarity Algorithm."

The steps of the Similarity Algorithm are as follows:
1) Determine the weights of an element of content's tagged categories.
2) Determine the weights of the categories used in the selection (or query).
3) For each piece of tagged content:
3a) For each category (such as age, height, weight, location, asking price, etc.).
3aa) Find the similarity of the content's category weights to the selection's category weights.
3b) Aggregate the similarities across all root categories for this piece of content.

The output of this calculation is a mapping of content object to relevance value.

The Similarity Algorithm may be customized in several ways. Regarding Step 2, when a selection is passed into the algorithm, the weight on each category is either 1 or 0: 1 if the category has been explicitly selected and 0 if it has not. The Similarity Algorithm uses the relationships (links) between categories to assign weights to categories that are related to the explicitly selected categories. These relationships (links) could be sibling relationships, parent/child relationships, cross-linked relationships (links to categories under other root categories), or any other type of relationship. Weights assigned to categories as links are based on the weight of the originating category in the link. The modifier used to assign weights to linked-to categories is adjustable. Regarding Step 3a, if desired, certain root categories can be ignored. Regarding Step 3aa, the method of comparison between the category weights in the selection and the category weights in the content is customizable. One method of comparison that can be used is a Cosine Coefficient algorithm. Another method of comparison that can be used is the "Smithgate Algorithm." Any other algorithm may be used to determine the degree of similarity between two pieces of tagged content. Regarding step 3b, the aggregation algorithm can take into account weights or rankings of the root categories, since certain root categories may be more important than other root categories.

Figure 12:
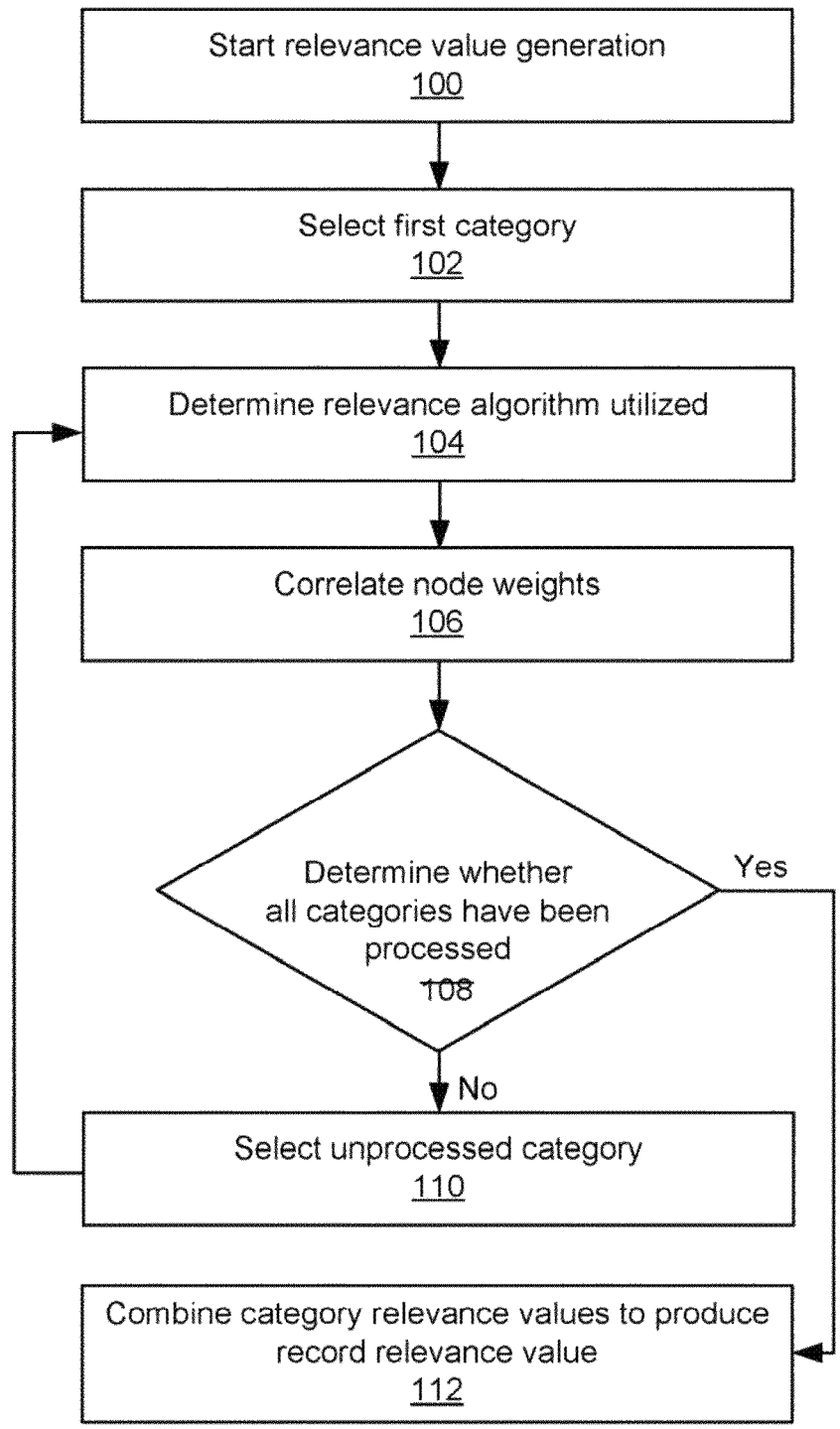
FIG. 12 illustrates an example flow chart of a process for generating a relevance value for a record.

As explained above, an embodiment can find relevant information even when text does not match. This is accomplished by establishing the relevance of data based upon correlating a user's selected data with the data of database 10. An embodiment of a process for generating a relevance value for a record is described in the flow chart of FIG. 12. In FIG. 12, the process starts at block 100 and, at block 102, a first category in a record is selected. At block 104, a relevance algorithm to be utilized is determined based upon the data structure of the category. In block 106, weights of the respective nodes of a selection tree TS and a data structure tree TD are correlated using the selected relevance algorithm. At block 108, a test is made to determine whether all categories in the record have been processed. If not, at block 110, the next unprocessed category is selected and the process returns to block 104 to process the next category. If at block 108 it is determined that all categories have been processed, then at block 112 the relevance values of the categories are combined to produce the relevance value of the record. In a preferred embodiment, this combining is performed by averaging, though if such averaging is used it is preferable to ignore unselected categories in the evaluation process. The process is complete upon determining the relevance value of each record. Having a relevance value for each record, a report may be prepared for the user, preferably in the order of decreasing relevance value.

Search results comprising exact and inexact matches may be produced using methods and algorithms described above. For example, in FIG. 11, search results may be produced by maintaining information (in structure database 10) regarding the structure of information in content database CD and using the structure database 10 to correlate the structure of a search query to the structure of the information in the content database CD. As a further example, search results may be produced by the "Similarity Algorithm" previously described.

A user interface may be provided for receiving user input for performing a search query on the content database CD, the search query comprising a set of one or more search criteria of one or more categories. The user interface (such as a graphical user interface) may be provided by web server W or content server C to receive user input from users (e.g., through users' computers U). In some embodiments, the user interface provides one or more user interface tools and/or user interface functions relating to the performance of search queries on the content database CD. In some embodiments, a user input tool includes a "geographic net" tool for changing the preferred geographic region. In response to receiving changes to the preferred geographic region (through changes to the perimeter of the geographic net) the user interface displays new search results comprising exact and/or inexact matches based on the changed geographic region. In some embodiments, a user input tool includes a "stack" tool associated with a group of categories, the "stack" tool being used for changing the weight value of the associated category. In response to receiving any changes (through, e.g., the stack tool) in the weight value of an associated category, the user interface displays new search results comprising exact and/or inexact matches based on the changed weight value. In some embodiments, a user interface function may comprise a "search-result selection" function for selecting a search result to provide information to produce new search criteria for a new search query to the database CD. The new search results may comprise exact and/or inexact matches based on the information of the selected search result.

Some embodiments of a user interface are described above in relation to a real estate service. This service is described for illustrative purposes only and the user interface embodiments may be used for any other type of service (such as any online service, any network based service, or any non-network based service). Other examples include a social networking service, an online dating service, a restaurant or food survey service, a news or article service, or any other type of special interest service.

In some embodiments, increasing the weight/importance value of a category increases the importance of determining the relevance value for the record, i.e., it becomes more important to determine whether or not the record contains information that matches the search criterion specified for the associated category. For example, simply increasing the weight of a category may increase the relevance value of a record from its previous relevance value. This occurs if the record contains information that matches the search criterion specified for the associated category because the category increased in importance. In contrast, simply increasing the weight of a category may decrease the relevance value of a record from its previous relevance value. This occurs if the record contains information that does not match the search criterion specified for the associated category because, again, the category has increased in importance. The same reasoning explains why, in some embodiments, decreasing the weight/importance of an associated category decreases the importance in determining the relevance value for the record. For example, for a real estate listing having a "4"

value that matches the "4" search criterion specified for the bedrooms 218c, increasing the weight of the bedrooms 218c category may increase the relevance value of the real estate listing from its previous relevance value. For a real estate listing having a bedroom value that does not match the "4" search criteria specified for the bedrooms 218c category, increasing the weight of the bedrooms 218c category may decrease the relevance value of the real estate listing from its previous relevance value. Regarding geographic location, for a real estate listing having a location that matches the geographic net defined by the user with geographic location 218a, decreasing the weight of the geographic location 218a category may decrease the relevance value of the real estate listing from its previous relevance value. For a real estate listing having a location that is not within geographic net 216, decreasing the weight of the geographic location 218a category may increase the relevance value of the real estate listing.

Changing one or more weights of one or more categories may change the relevance values determined for records of the database, since the relevance values are determined, in part, based on the weights of the categories. Thus, upon the user interface receiving (through a change to stack 231 order, or to pie chart 233) a change to the weight of a category, the list ordering of the inexact matches shown in the user interface may also change based the new relevance values determined for the inexact matches using the new weight value.

In some embodiments, the user interface dynamically shows new list orderings of the inexact matches in the search-results section 213 in real-time based on one or more new weights of one or more categories (received through changing field positions in stack 231 or one or more category-weight slider tools (not shown)). In these embodiments, changes in the list ordering of the inexact matches may also be shown dynamically and in real-time as category weights are changed by the user. The new list orderings of the inexact matches may be shown dynamically and in real-time as category weights are changed, without requiring the user to type in new category weights or to otherwise initiate displaying the new list orderings, e.g., by selecting/clicking a search button (not shown) to begin a new search. By not requiring that the user initiate a new list, category weights can be continually revised using the stack 231, pie chart 233, or category-weight slider tools (not shown) or both as new list orderings of inexact matches are shown in the user interface. For example, in FIG. 6, as the user increased the weight of bedrooms 218c by dragging and dropping it above baths 218e (FIG. 7), the list ordering displayed in results-section 213 by user interface 200 may change dynamically and in real-time based on the changed category weight(s). Similarly, in some embodiments, the user interface 200 dynamically and in real-time shows new search results (comprising exact matches and/or inexact matches) as well as new symbol representations of the search results on a map 202 as it receives new search criteria of a category from a user. Thus, the user interface 200 displays changing search results and changing symbol representations of the search results on a map 202 dynamically and in real-time as a user changes one or more search criteria of one or more categories, without requiring the user to type in new category weights and/or new search criteria or to otherwise initiate display of the new search results and new symbol representations.

In some embodiments, the search-result selection function may be used in any of the user interfaces discussed herein and in conjunction with any of the user interface tools described herein (such as the geographic net, stack, and slider tool) to provide exact and/or inexact matches. In some embodiments, any of the user interface tools or functions described herein may be used in any combination and be implemented in a user interface providing exact and/or inexact matches. For example, one or more geographic nets, one or more stacks, and one or more one or more slider tools, or any combination thereof, may be provided in a same user interface, with the user interface showing search results comprising exact and/or inexact matches.

Further information regarding user interfaces for search methods and systems can be found in U.S. patent application Ser. No. 12/120,144, to Steven D. Levine, filed May 13, 2008, and entitled User Interface for Search Method and System, which is hereby incorporated in its entirety by reference.

Some embodiments may be conveniently implemented using a conventional general purpose or a specialized digital computer or microprocessor programmed according to the teachings herein, as will be apparent to those skilled in the computer art. Some embodiments may be implemented by a general purpose computer programmed to perform method or process steps described herein. Such programming may produce a new machine or special purpose computer for performing particular method or process steps and functions (described herein) pursuant to instructions from program software. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information may be represented using any of a variety of different technologies and techniques.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a non-transitory computer readable medium. The computer readable medium may comprise a storage medium having instructions stored thereon/in which may be used to control, or cause, a computer to perform any of the processes of an embodiment. The storage medium may include, without limitation, any type of device including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Those of skill would further appreciate that the various illustrative logical blocks, circuits, modules, algorithms, techniques, processes, or method steps of embodiments described herein may be implemented as computer electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The algorithm, techniques, processes, or methods described in connection with embodiments disclosed herein may be embodied directly in hardware, in software executed by a processor, or in a combination of the two. In some embodiments, any software application, program, tool, module, or layer described herein may comprise an engine comprising hardware and/or software configured to perform embodiments described herein. In general, functions of a software application, program, tool, module, or layer described herein may be embodied directly in hardware, or embodied as software executed by a processor, or embodied as a combination of the two. A software application, layer, or module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

What is claimed is:

1. A computer-implemented method, comprising:
   receiving, from a user, a search query comprising a plurality of search criteria associated with a plurality of categories for searching a database that comprises a plurality of records arranged in the categories;
   receiving, from the user, through a graphical user interface,
   a weight value for a first category to ascribe an importance of the first category as more or less important than a second category to a search result;
   comparing the search criteria of the search query with information in the records of the database for each category;
   identifying, in response to the search query, one or more inexact matching records that comprises records with information that does not exactly match the search criteria of one or more of the categories;
   generating a relevance value for each of the inexact matching records to represent a degree of relevance of the inexact matching record to the search query based, in part, on weight values associated with the categories; and
   determining one or more characteristics for displaying the inexact matching records based on the relevance values of the inexact matching records.

2. The computer-implemented method as set forth in claim 1, further comprising:
   receiving a second weight value for at least one of the categories; and
   generating a new relevance value for each of the inexact matching records based on the second weight value.

3. The computer-implemented method as set forth in claim 1, wherein: determining one or more characteristics for displaying the inexact matching records
   comprises displaying the inexact matching records in response to the search query in an order based on the relevance values.

4. The computer-implemented method as set forth in claim 1, wherein:
   determining one or more characteristics for displaying the inexact matching records
   comprises displaying a subset of the inexact matching records in response to the search query in an order based on the relevance values.

5. The computer-implemented method as set forth in claim 1, wherein: receiving, from the user, through a graphical user interface, a weight value comprises:
   displaying a stack of a plurality of geometric objects, one for each category; and
   receiving, from the user, input to order the geometric objects in the stack so as to ascribe a weight to the categories corresponding to the order of the stack.

6. The computer-implemented method as set forth in claim 5, wherein each geometric object in the stack comprises a user-definable weight.

7. The computer-implemented method as set forth in claim 5, wherein receiving, from the user, input to order the geometric objects in the stack comprises receiving input that specifies a drag and drop operation to move and order the geometric objects in the stack.

8. The computer-implemented method as set forth in claim 5, wherein displaying a stack of a plurality of geometric objects comprises displaying, either vertically or horizontally, the stack of geometric objects.

9. The computer-implemented method as set forth in claim 1, wherein: receiving, from the user, through a graphical user interface, a weight value comprises:
  displaying a plurality of layers of a chart, wherein each layer corresponds to one of the categories; and
  receiving, from the user, input to select a layer and effect a change to the thickness of the layer so as to ascribe a weight to one or more categories based on the thickness of a corresponding layer.

10. The computer-implemented method as set forth in claim 1, wherein: receiving, from the user, through a graphical user interface, a weight value comprises:
  displaying a plurality of pieces of a pie, wherein each piece corresponds to one of the categories; and
  receiving, from the user, input to change an area of one or more pieces of the pie so as to ascribe a weight to one or more categories based on the area of the corresponding piece.

11. The computer-implemented method as set forth in claim 10, wherein: each piece of the pie comprises two radii originating from an inner point and terminating in an arc, wherein the user graphically manipulates the chart by selecting a slice and effecting a change to the length of the arc.

12. The computer-implemented method as set forth in claim 11, wherein: receiving input to change the length of the arc of the selected slice causes an equal and
  opposite change in the length of the arc of a neighboring slice.

13. The computer-implemented method as set forth in claim 11, wherein: receiving input to change the length of the arc of the selected slice causes an equal and
  opposite change divided among any other slice.

14. A computer-implemented method, comprising: displaying a map that depicts a geographic location;
  receiving, from a user, input that graphically defines a perimeter for a search location within the geographic location of the map;
  receiving, from the user, a search query comprising a plurality of search criteria associated with the plurality of categories for searching a database that comprises a plurality of records arranged in the categories, wherein at least one of said categories comprises the search location within the geographic location;
  receiving, from the user, a weight value for a first category to ascribe an importance of the first category as more or less important than a second category to a search result;
  comparing the search criteria of the search query with information in the records of the database for each category;
  identifying, in response to the search query, one or more inexact matching records that comprises records with information that does not exactly match the search criteria of one or more of the categories;
  generating a relevance value for each of the inexact matching records to represent a degree of relevance of the inexact matching record to the search query based, in part, on weight values associated with the categories; and
  displaying the inexact matching records within the geographic location based on the relevance values of the inexact matching records.

15. The computer-implemented method as set forth in claim 14, further comprising:
  identifying, in response to the search query, one or more matching records that comprises
  records with information that matches the search criteria of one or more of the categories; and
  displaying the matching records within the search location of the geographic location.

16. The computer-implemented method as set forth in claim 15, further comprising:
  displaying a first symbol for the matching records within the search location of the geographic location; and
  displaying a second symbol for the inexact matching records outside of the search location of the geographic location.

17. The computer-implemented method as set forth in claim 16, wherein:
  the first symbol comprises a first color and the second symbol comprises a second color.

18. The computer-implemented method as set forth in claim 14, further comprising: receiving, from a user, input that graphically re-defines the perimeter of the search
  location within the geographic map.

19. The computer-implemented method as set forth in claim 14, wherein: receiving, from a user, input that graphically defines a search location within the
  geographic location of the map comprises receiving input to move a point on the perimeter to re-define the search location.

20. The computer-implemented method as set forth in claim 14, wherein: receiving, from a user, input that graphically defines a search location within the
  geographic location of the map comprises receiving input that defines a plurality of fix points and a plurality of lines, that connect the fix points, on the map to create the perimeter.

* * * * *